United States Patent
Sondhi et al.

(10) Patent No.: US 10,621,329 B2
(45) Date of Patent: Apr. 14, 2020

(54) MOBILE APPLICATION, RESOURCE MANAGEMENT ADVICE

(71) Applicant: Oracle International Corporation, Redwood Shores, CA (US)

(72) Inventors: Ajay Sondhi, San Jose, CA (US); Ching-Wen Chu, San Jose, CA (US); Beomsuk Kim, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/392,398

(22) Filed: Apr. 23, 2019

(65) Prior Publication Data

US 2019/0251246 A1 Aug. 15, 2019

Related U.S. Application Data

(63) Continuation of application No. 15/934,544, filed on Mar. 23, 2018, now Pat. No. 10,325,089, which is a (Continued)

(51) Int. Cl.
*G06F 15/16* (2006.01)
*G06F 21/41* (2013.01)
(Continued)

(52) U.S. Cl.
CPC .......... *G06F 21/41* (2013.01); *H04L 63/0807* (2013.01); *H04L 63/0815* (2013.01); *H04L 67/306* (2013.01); *H04W 12/06* (2013.01)

(58) Field of Classification Search
CPC ............. H04L 63/0807; H04L 63/0815; H04L 67/306; G06F 21/41; H04W 12/03
(Continued)

(56) References Cited

U.S. PATENT DOCUMENTS 6,092,196 A * 7/2000 Reiche .................... G06F 21/41
                                                    705/52
6,092,204 A * 7/2000 Baker ................ G01R 33/4833
                                                    726/5
(Continued)

FOREIGN PATENT DOCUMENTS

| CN | 1612130 | 5/2005 |
| CN | 101207482 | 6/2008 |

(Continued)

OTHER PUBLICATIONS

U.S. Appl. No. 13/485,283, Advisory Action dated Aug. 21, 2014, 3 pages.
(Continued)

*Primary Examiner* — Thu Ha T Nguyen
(74) *Attorney, Agent, or Firm* — Kilpatrick Townsend & Stockton LLP

(57) ABSTRACT

Techniques for a resource management advice service are provided. In some examples, resource management advice and/or instructions may be provided for use with mobile devices, mobile applications, cloud applications, and/or other web-based applications. For example a mobile client may request to perform one or more resource management operations associated with a service provider. Based at least in part on the requested operation and/or the particular service provider, advice and/or instructions for managing the resource may be provided.

20 Claims, 11 Drawing Sheets

Related U.S. Application Data continuation of application No. 13/485,569, filed on May 31, 2012, now Pat. No. 9,965,614.

(60) Provisional application No. 61/541,034, filed on Sep. 29, 2011.

(51) Int. Cl.
*H04L 29/06* (2006.01)
*H04L 29/08* (2006.01)
*H04W 12/06* (2009.01)

(58) Field of Classification Search
USPC .................................................. 709/217, 218
See application file for complete search history.

(56) References Cited

U.S. PATENT DOCUMENTS

| | | | |
|---|---|---|---|
| 6,438,594 B1* | 8/2002 | Bowman-Amuah | G06F 9/4488 709/225 |
| 6,516,416 B2 | 2/2003 | Gregg et al. | |
| 6,529,948 B1* | 3/2003 | Bowman-Amuah | G06F 9/4493 709/217 |
| 7,290,288 B2 | 10/2007 | Gregg et al. | |
| 7,415,509 B1* | 8/2008 | Kaltenmark | G06F 16/95 709/219 |
| 7,500,262 B1 | 3/2009 | Sanin et al. | |
| 7,631,346 B2 | 12/2009 | Hinton et al. | |
| 7,721,329 B2* | 5/2010 | Toomey | G06F 21/31 726/9 |
| 8,225,385 B2* | 7/2012 | Chow | H04L 9/3271 726/8 |
| 8,255,984 B1 | 8/2012 | Ghostine et al. | |
| 8,281,149 B2 | 10/2012 | Laurie et al. | |
| 8,296,784 B1* | 10/2012 | Brown | G06F 9/541 705/319 |
| 8,316,424 B2* | 11/2012 | Henry | G06Q 40/00 380/270 |
| 8,533,796 B1 | 9/2013 | Shenoy et al. | |
| 8,621,561 B2* | 12/2013 | Cross | H04L 9/3213 705/65 |
| 8,832,787 B1 | 9/2014 | Sanin et al. | |
| 9,081,951 B2 | 7/2015 | Sondhi et al. | |
| 9,495,533 B2 | 11/2016 | Yiu et al. | |
| 9,600,652 B2 | 3/2017 | Sondhi et al. | |
| 9,692,747 B2 | 6/2017 | Bailey et al. | |
| 9,699,170 B2* | 7/2017 | Sondhi | H04L 63/08 |
| 9,722,873 B2* | 8/2017 | Zhu | G06F 16/27 |
| 9,847,990 B1 | 12/2017 | De Boursetty et al. | |
| 9,860,234 B2* | 1/2018 | Sondhi | H04L 63/0807 |
| 9,965,614 B2 | 5/2018 | Sondhi et al. | |
| 2004/0010682 A1 | 1/2004 | Foster et al. | |
| 2005/0039008 A1 | 2/2005 | Bhatia et al. | |
| 2005/0124320 A1 | 6/2005 | Ernst et al. | |
| 2006/0031683 A1 | 2/2006 | Marion et al. | |
| 2006/0075224 A1 | 4/2006 | Tao | |
| 2006/0075475 A1 | 4/2006 | Boulos et al. | |
| 2006/0236382 A1 | 10/2006 | Hinton et al. | |
| 2006/0294196 A1 | 12/2006 | Feirouz et al. | |
| 2007/0006299 A1 | 1/2007 | Elbury et al. | |
| 2007/0008597 A1 | 1/2007 | Watanabe et al. | |
| 2007/0030824 A1 | 2/2007 | Ribaudo et al. | |
| 2007/0050845 A1 | 3/2007 | Das et al. | |
| 2007/0055703 A1* | 3/2007 | Zimran | H04L 29/12594 |
| 2007/0156594 A1* | 7/2007 | McGucken | G06F 21/10 705/51 |
| 2007/0204167 A1 | 8/2007 | Beker et al. | |
| 2007/0226785 A1 | 9/2007 | Chow et al. | |
| 2008/0033954 A1 | 2/2008 | Brooks et al. | |
| 2008/0059804 A1 | 3/2008 | Shah et al. | |
| 2008/0134295 A1* | 6/2008 | Bailey | G06F 21/41 726/4 |
| 2008/0171541 A1 | 7/2008 | Dahlin et al. | |
| 2008/0212783 A1 | 9/2008 | Oba | |
| 2008/0270363 A1* | 10/2008 | Hunt | G06F 16/2462 |
| 2008/0288889 A1* | 11/2008 | Hunt | G06Q 30/02 715/810 |
| 2008/0294781 A1 | 11/2008 | Hinton et al. | |
| 2008/0294996 A1* | 11/2008 | Hunt | G06Q 30/02 715/739 |
| 2009/0018996 A1* | 1/2009 | Hunt | G06F 16/283 |
| 2009/0113024 A1* | 4/2009 | Verma | H04L 29/06027 709/219 |
| 2009/0113527 A1 | 4/2009 | Naaman et al. | |
| 2009/0160658 A1 | 6/2009 | Armstrong et al. | |
| 2009/0217367 A1 | 8/2009 | Norman et al. | |
| 2009/0235349 A1* | 9/2009 | Lai | H04L 9/3213 726/14 |
| 2009/0249076 A1* | 10/2009 | Reed | G06Q 30/00 713/181 |
| 2009/0287683 A1 | 11/2009 | Bennett | |
| 2009/0292927 A1 | 11/2009 | Wenzel et al. | |
| 2009/0328207 A1 | 12/2009 | Patel | |
| 2010/0095372 A1 | 4/2010 | Hodgkinson et al. | |
| 2010/0122333 A1 | 5/2010 | Noe | |
| 2010/0146394 A1 | 6/2010 | Morris | |
| 2010/0154041 A1 | 6/2010 | Dalzell et al. | |
| 2010/0162124 A1 | 6/2010 | Morris | |
| 2010/0169952 A1 | 7/2010 | Maki et al. | |
| 2010/0223471 A1 | 9/2010 | Fresko et al. | |
| 2010/0274910 A1 | 10/2010 | Ghanaie-Sichanie et al. | |
| 2010/0306547 A1 | 12/2010 | Fallows et al. | |
| 2010/0325441 A1* | 12/2010 | Laurie | G06F 21/31 713/185 |
| 2011/0041171 A1 | 2/2011 | Burch et al. | |
| 2011/0202988 A1 | 8/2011 | Otranen et al. | |
| 2011/0209202 A1* | 8/2011 | Otranen | H04L 63/08 726/4 |
| 2011/0231921 A1 | 9/2011 | Narayanan et al. | |
| 2011/0264913 A1* | 10/2011 | Nikander | H04L 63/0815 713/168 |
| 2011/0277016 A1 | 11/2011 | Hockings et al. | |
| 2011/0320879 A1 | 12/2011 | Singh et al. | |
| 2012/0023556 A1 | 1/2012 | Schultz et al. | |
| 2012/0036563 A1 | 2/2012 | Glasgow et al. | |
| 2012/0054625 A1 | 3/2012 | Pugh et al. | |
| 2012/0078944 A1 | 3/2012 | Lloyd et al. | |
| 2012/0079569 A1 | 3/2012 | Mendelovich et al. | |
| 2012/0151568 A1 | 6/2012 | Pieczul et al. | |
| 2012/0154341 A1 | 6/2012 | Chan et al. | |
| 2012/0174196 A1* | 7/2012 | Bhogavilli | H04L 63/1458 726/5 |
| 2012/0226908 A1* | 9/2012 | Mokrushin | H04L 9/3271 713/168 |
| 2012/0254957 A1* | 10/2012 | Fork | G06F 21/33 726/6 |
| 2012/0265997 A1 | 10/2012 | Laurie et al. | |
| 2012/0284786 A1 | 11/2012 | Somani et al. | |
| 2012/0290478 A1 | 11/2012 | Crofts et al. | |
| 2013/0007456 A1* | 1/2013 | Dean | H04L 9/0844 713/171 |
| 2013/0024919 A1 | 1/2013 | Wetter et al. | |
| 2013/0031203 A1 | 1/2013 | Bestfleisch et al. | |
| 2013/0055243 A1 | 2/2013 | Dandekar et al. | |
| 2013/0086669 A1* | 4/2013 | Sondhi | G06F 21/41 726/8 |
| 2013/0086670 A1 | 4/2013 | Vangpat et al. | |
| 2013/0125226 A1 | 5/2013 | Shah et al. | |
| 2013/0174154 A1* | 7/2013 | Poore | G06F 8/00 718/1 |
| 2013/0174241 A1 | 7/2013 | Cha et al. | |
| 2013/0191884 A1 | 7/2013 | Leicher et al. | |
| 2013/0196697 A1* | 8/2013 | Lew | H04W 4/21 455/466 |
| 2014/0089661 A1* | 3/2014 | Mahadik | H04L 61/1511 713/162 |
| 2014/0090028 A1 | 3/2014 | Matsugashita | |
| 2014/0123236 A1* | 5/2014 | Hirata | H04L 63/0807 726/4 |
| 2014/0208119 A1 | 7/2014 | Chang et al. | |

(56) References Cited

U.S. PATENT DOCUMENTS

| | | | |
|---|---|---|---|
| 2015/0019944 A1 | 1/2015 | Kalgi | |
| 2015/0089569 A1* | 3/2015 | Sondhi | H04L 63/08 |
| | | | 726/1 |
| 2015/0101025 A1* | 4/2015 | Murata | G06F 21/10 |
| | | | 726/4 |
| 2015/0101034 A1 | 4/2015 | Sarkar et al. | |
| 2015/0113126 A1* | 4/2015 | Fluehr | H04L 67/22 |
| | | | 709/224 |
| 2015/0180868 A1 | 6/2015 | Sng | |
| 2015/0312715 A1* | 10/2015 | Haavisto | H04W 4/021 |
| | | | 455/456.3 |
| 2015/0333909 A1 | 11/2015 | Omori et al. | |
| 2015/0350338 A1 | 12/2015 | Barnett et al. | |
| 2015/0350362 A1 | 12/2015 | Pollack et al. | |
| 2015/0381621 A1 | 12/2015 | Innes et al. | |
| 2016/0014077 A1 | 1/2016 | Plotnik et al. | |
| 2016/0028737 A1* | 1/2016 | Srinivasan | H04L 63/0807 |
| | | | 726/1 |
| 2016/0105422 A1 | 4/2016 | Burch et al. | |
| 2016/0127352 A1 | 5/2016 | Xu et al. | |
| 2016/0142408 A1 | 5/2016 | Raepple | |
| 2016/0164722 A1* | 6/2016 | Zhu | G06F 16/27 |
| | | | 709/221 |
| 2016/0366119 A1* | 12/2016 | Rykowski | H04L 63/0815 |
| 2017/0019410 A1 | 1/2017 | Reilly et al. | |
| 2017/0116056 A1* | 4/2017 | Nelaturu | G06F 9/52 |
| 2017/0149837 A1* | 5/2017 | Sondhi | H04L 63/08 |
| 2017/0163636 A1 | 6/2017 | Nishida | |
| 2017/0302655 A1* | 10/2017 | Sondhi | H04L 63/0807 |
| 2018/0293389 A1* | 10/2018 | Mahaffey | H04L 63/1425 |
| 2018/0295134 A1 | 10/2018 | Gupta et al. | |

FOREIGN PATENT DOCUMENTS

| | | |
|---|---|---|
| CN | 101277193 | 10/2008 |
| CN | 102111410 | 6/2011 |
| EP | 2761527 | 2/2019 |
| JP | 2002041467 | 2/2002 |
| JP | 2003316743 | 11/2003 |
| JP | 2006221506 | 8/2006 |
| WO | 172009 | 9/2001 |

OTHER PUBLICATIONS

U.S. Appl. No. 13/485,283, Final Office Action dated Jul. 30, 2014, 14 pages.
U.S. Appl. No. 13/485,283, Final Office Action dated Jun. 10, 2015, 16 pages.
U.S. Appl. No. 13/485,283, Final Office Action dated Mar. 10, 2016, 18 pages.
U.S. Appl. No. 13/485,283, Final Office Action dated Feb. 22, 2017, 22 pages.
U.S. Appl. No. 13/485,283, Final Office Action dated Jul. 11, 2017, 23 pages.
U.S. Appl. No. 13/485,283, Non-Final Office Action dated Dec. 29, 2014, 14 pages.
U.S. Appl. No. 13/485,283, Non-Final Office Action dated Feb. 7, 2014, 14 pages.
U.S. Appl. No. 13/485,283, Non-Final Office Action dated Oct. 19, 2015, 15 pages.
U.S. Appl. No. 13/485,283, Non-Final Office Action dated Sep. 19, 2016, 21 pages.
U.S. Appl. No. 13/485,420, Final Office Action dated Apr. 24, 2015, 12 pages.
U.S. Appl. No. 13/485,420, Non-Final Office Action dated Dec. 31, 2015, 17 pages.
U.S. Appl. No. 13/485,420, Non-Final Office Action dated Jul. 9, 2014, 17 pages.
U.S. Appl. No. 13/485,420, Notice of Allowance dated Jun. 8, 2016, 7 pages.
U.S. Appl. No. 13/485,509, Final Office Action dated Oct. 2, 2014, 9 pages.
U.S. Appl. No. 13/485,509, Non-Final Office Action dated Apr. 15, 2014, 7 pages.
U.S. Appl. No. 13/485,509, Notice of Allowance dated Mar. 20, 2015, 15 pages.
U.S. Appl. No. 13/485,569, Advisory Action dated May 25, 2017, 4 pages.
U.S. Appl. No. 13/485,569, Final Office Action dated Jan. 29, 2015, 10 pages.
U.S. Appl. No. 13/485,569, Final Office Action dated Jan. 7, 2016, 10 pages.
U.S. Appl. No. 13/485,569, Final Office Action dated Jan. 27, 2017, 13 pages.
U.S. Appl. No. 13/485,569, Final Office Action dated Aug. 14, 2017, 14 pages.
U.S. Appl. No. 13/485,569, Non-Final Office Action dated Jul. 15, 2015, 10 pages.
U.S. Appl. No. 13/485,569, Non-Final Office Action dated May 28, 2014, 10 pages.
U.S. Appl. No. 13/485,569, Non-Final Office Action dated Jun. 15, 2016, 11 pages.
U.S. Appl. No. 13/485,569, Notice of Allowance dated Feb. 9, 2018, 9 pages.
U.S. Appl. No. 14/791,733, Non-Final Office Action dated Jul. 25, 2016, 10 pages.
U.S. Appl. No. 14/791,733, Notice of Allowance dated Nov. 10, 2016, 5 pages.
U.S. Appl. No. 15/934,544, Non-Final Office Action dated Jan. 14, 2019, 10 pages.
U.S. Appl. No. 15/934,544, Notice of Allowance dated Feb. 21, 2019, 9 pages.
Chinese Application No. 201280054799.1, Office Action dated Nov. 1, 2016, 18 pages (12 pages of Original Document and 6 pages of English Translation).
Chinese Application No. 201280054799.1, Office Action dated Apr. 12, 2017, 22 pages (14 pages of Original Document and 8 pages of English Translation).
Chinese Application No. 201280054799.1, Office Action dated Mar. 3, 2016, 31 pages (23 pages of Original Document and 8 pages of English Translation).
Chinese Application No. 201280054799.1, Office Action dated Sep. 28, 2017, 8 pages (3 pages of Original Document and 5 pages of English Translation).
Chinese Application No. 201810177243.0, Office Action dated Oct. 8, 2018, 14 pages (6 pages of Original Document and 8 pages of English Translation).
Chinese Application No. 201810177243.0, Office Action dated Mar. 20, 2019, 27 pages (11 pages of Original Document and 16 pages of English Translation).
European Application No. 12773176.8, Office Action dated Feb. 12, 2018, 6 pages.
Japanese Application No. 2014-533329, Office Action dated Sep. 27, 2016, 4 pages.
International Application No. PCT/US2012/057622, International Preliminary Report on Patentability dated Apr. 10, 2014, 8 pages.
International Application No. PCT/US2012/057622, International Search Report and Written Opinion dated Dec. 3, 2012, 11 pages.
India Patent Application IN2442/CHENP/2014, First Examination Report dated Jan. 27, 2020, 6 pages.

* cited by examiner

MOBILE APPLICATION, RESOURCE MANAGEMENT ADVICE

CROSS REFERENCES TO RELATED APPLICATIONS

The present application is a continuation of, and claims the benefit and priority of U.S. patent application Ser. No. 15/934,544, filed Mar. 23, 2018, entitled MOBILE APPLICATION, RESOURCE MANAGEMENT ADVICE, which is a continuation of, and claims the benefit and priority of U.S. patent application Ser. No. 13/485,569, filed May 31, 2012, entitled MOBILE APPLICATION, RESOURCE MANAGEMENT ADVICE, now U.S. Pat. No. 9,965,614, which claims the benefit and priority under 35 U.S.C. 119(e) of U.S. Provisional Application No. 61/541,034, filed Sep. 29, 2011, entitled MOBILE SECURITY AND SINGLE SIGN-ON, the entire contents of which are incorporated herein by reference for all purposes. This application is also related to application Ser. No. 13/485,283, filed on May 31, 2012 entitled "MOBILE APPLICATION, SINGLE SIGN-ON MANAGEMENT," application Ser. No. 13/485,420 filed on May 31, 2012 entitled "MOBILE APPLICATION, IDENTITY RELATIONSHIP MANAGEMENT," now U.S. Pat. No. 9,495,533, and application Ser. No. 13/485,509, filed on May 31, 2012 entitled "MOBILE APPLICATION, IDENTITY INTERFACE," now U.S. Pat. No. 9,081,951, the entire contents of each is hereby incorporated by reference as if fully set forth herein, under 35 U.S.C. § 120.

BACKGROUND

Modern enterprise computing solutions often deploy one or more service providers for allowing resource management operations, authentication, authorization, token exchanges, etc. Additionally, enterprise solutions may regularly change implementation strategies and/or service providers that allow the resource management operations and/or other services. However, one or more client applications may not be aware of appropriate actions for implementing such operations, regardless of whether they have changed. As such, finding improved ways to provide resource management advice continues to be a priority.

BRIEF SUMMARY

Techniques for a resource management advice service are provided. In some examples, resource management advice and/or instructions may be provided for use with mobile devices, mobile applications, cloud applications, and/or other web-based applications. For example, a mobile client may request to perform one or more resource management operations associated with a service provider. Based at least in part on the requested operation and/or the particular service provider, advice and/or instructions for managing the resource may be provided.

According to at least one example, a computer readable memory may store instructions that, when executed by one or more processors, cause the one or more processors to receive a request to manage a secure resource of a service provider. The request may be received from a client application and may be formatted as a representational state transfer (REST) call. Additionally, the instructions may also cause the one or more processors to determine an acquisition path for performing the management of the secure resource. The instructions may further cause the one or more processors to generate an instruction set for following the acquisition path. The instruction set may include at least one instruction. Further, the instructions may cause the one or more processors to transmit the instruction set to the client application.

In one example, the client application from which the request is received may be implemented as a mobile application of a mobile device, a software as a service (SaaS) application, and/or a Rich Internet Application (RIA). Additionally, in some examples, the request to manage the secure resource may include a request to access the secure resource, a request to update the secure resource, or a request to delete the secure resource. The secure resource may include profile information associated with a user of the client application, payroll information associated with a user of the client application, or social information associated with a user of the client application. The generated instruction may, in some cases, be protected by a security filter. In some aspects, the acquisition path may be determined dynamically based at least in part on the secure resource and/or a change associated with the secure resource.

In one example, the instructions may cause the one or more processors to receive, based at least in part on the transmitted instruction set, an authentication request from the client application. The instructions may also cause the one or more processors to provide, based at least in part on the authentication request, an authentication token to the client application.

Additionally, in some examples, the instructions may cause the one or more processors to determine a second acquisition path for performing the management of the secure resource, generate a second instruction set, and transmit the second instruction set to the client.

Techniques for managing single sign-on are also provided. In some examples, single sign-on functionality may be provided for use on mobile devices by utilizing mobile applications, cloud applications, and/or other web-based applications. For example, a mobile application or mobile web browser may request to authenticate with or access one or more service providers. Authentication credentials may be requested from a user of the mobile device to facilitate such authentication and/or access. Based at least in part on a successful log-in, access to server resources from other applications on the same mobile device may be provided without successive or repetitive credential requests to the user.

According to at least one example, a computer readable memory may store instructions that, when executed by one or more processors, cause the one or more processors to receive one or more requests to access a service provider. In some examples, the requests may be received from a first application of the mobile device. Additionally, the instructions may also cause the one or more processors to log in a user associated with the first application. The instructions may further cause the one or more processors to provide a token for accessing the service provider to the first application. A second token may then be provided to a second application.

In some examples, the first application may be configured as an application agent for providing single sign-on functionality for the second application. Additionally, in some examples, the second application may be configured as a web browser application or a native application.

In one example, the first application may be configured as a browser application associated with a web service while the second application may be configured as a native application associated with an application service provider. The browser application and the native application may be executed or otherwise hosted by a mobile device.

In some examples, the first application may be configured as a native application of a mobile device. The native application may be associated with an application service provider. Additionally, the second application may be configured as a browser application associated with a web application. The browser application may be executed or otherwise hosted by a mobile device. Further, in some examples, the second application may be configured as a second native application associated with a second application service. The second native application may also be executed or otherwise hosted by the mobile device.

In one example, a log-in of the user may include an authentication of the user with an authentication service that utilizes a representational state transfer (REST) call. In another example, a second token provided to a second application may enable the second application to log in to an application service provider associated with the second application without the user providing log-in credentials to the application service provider associated with the second application.

Techniques for managing identities are also provided. In some examples, identity management, authentication, authorization, and token exchange frameworks may be provided for use with mobile devices, mobile applications, cloud applications, and/or other web-based applications. For example a mobile client may request to perform one or more identity management operations associated with an account of a service provider. Based at least in part on the requested operation and/or the particular service provider, an application programming interface (API) may be utilized to generate and/or perform one or more instructions and/or method calls for managing identity information of the service provider.

According to at least one example, a system may receive a request to perform a function associated with a service provider. The request may be received from a client application and may be formatted as a representational state transfer (REST) call. Additionally, the system may also determine an access management service call corresponding to the service provider for which performance of the function is being requested. Further, the system may perform the access management service call.

In one example, the client application from which the request is received may be implemented as a mobile application of a mobile device, a software as a service (SaaS) application, and/or a Rich Internet Application (MA).

Additionally, in some examples, the request to perform the function associated with the service provider may include an authorization request. The authentication request may include a user identifier (ID) of a user of the client application. The authentication request may also include a password of the user and/or a client token used to indicate that the client application has been authenticated. The user ID and the password may, in some cases, be used to authenticate the user with the access management service.

In one example, the access management service call performed by the system may include a method call to implement a token exchange.

Additionally, in some examples, the request to perform the function associated with the service provider may include an access request. The access request may, in some cases, include a client token indicating that the client is authenticated, a user token indicating that the user is authenticated, and/or an indication of the service provider for which access is being requested. In some cases, the system may receive an indication that the user and/or the client application have been granted access to the service provider by the access management service. In this case, the system may then provide an access token to the client application.

In one example, service calls for a first access management service may be different from service calls for a second access management service. Further, in some cases, the access management service to be utilized may be specified by the service provider, but not indicated to the client application. In this way, the client application can make REST calls independent of the API or other configuration of the service provider.

According to at least one example, a system may receive an instruction to manage an identity. The system may also be configured to model an identity relationship, associated with the identity that is to be managed, as a uniform resource identifier (URI). The system may also map the URI to a schema associated with a service provider and/or transmit the schema to the service provider for managing the identity as requested.

In some examples, the received instruction to manage an identity may be received by a mobile client application, an RIA, or a SaaS application. The received instruction may also be formatted as a REST call. Additionally, in some aspects, the modeled identity relationship may include the identity to be managed and/or an association between the identity and another entity. Further, the identity relationship may be modeled as a URI based at least in part on a string of characters including the identity and the association.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
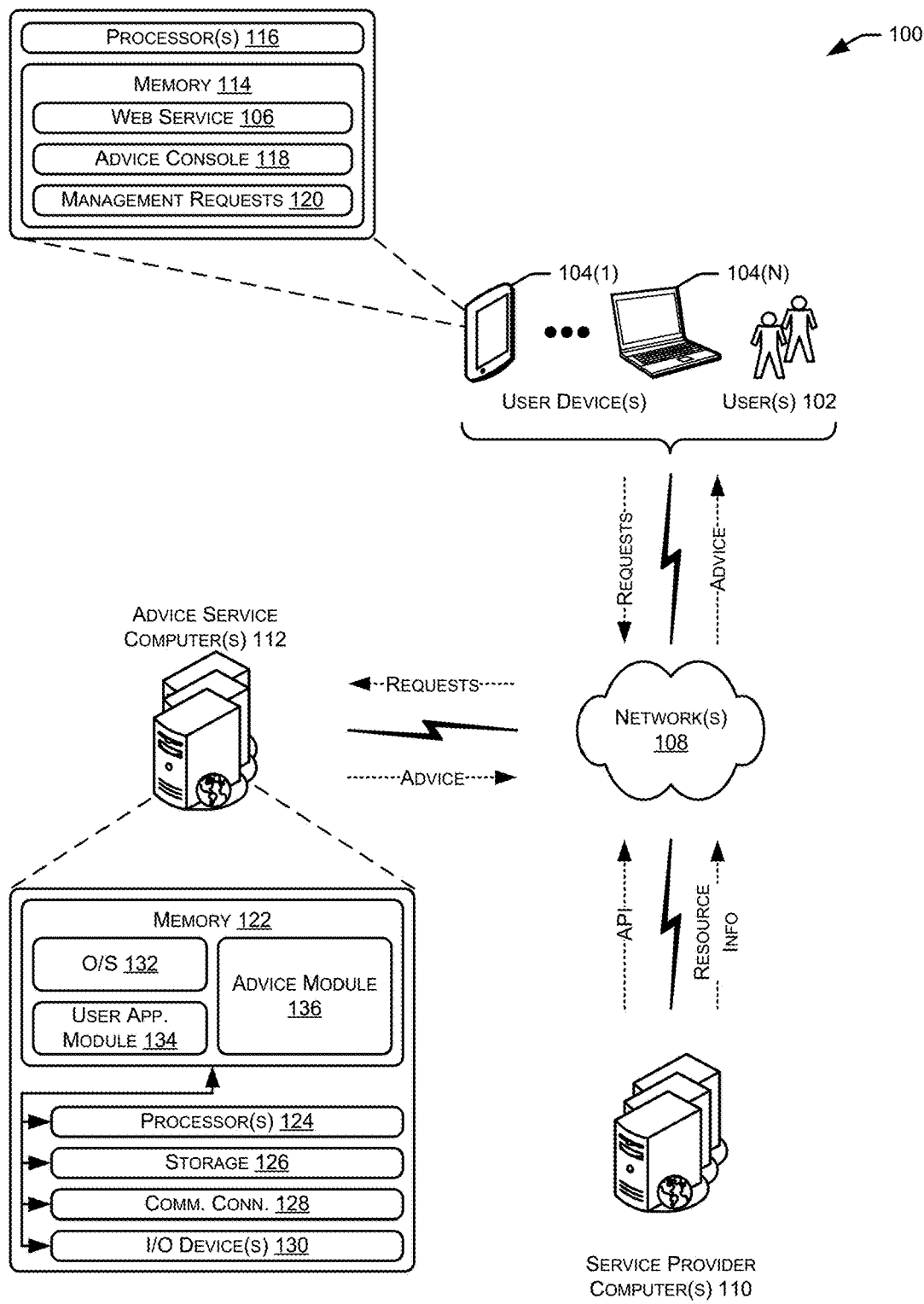
FIG. 1 is a simplified block diagram illustrating an example architecture for providing managing resource advice that includes one or more identity interface computers, one or more user devices, and one or more other computing solutions connected via one or more networks, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing resource management advice via an identity interface to one or more entities (e.g., mobile computing devices and/or other client computing devices) via a computing resource and/or resource management advice service computing system. As used herein, a resource management advice service (hereinafter, "advice service") may include one or more computing systems for providing advice and/or instructions to enable client applications to manage resources of a service provider. For example, an advice service may receive requests from a client application (e.g., mobile applications of mobile devices, SaaS applications, RIAs, combinations of the foregoing, or the like) to manage one or more resources of a third-party service provider and provide, in response, advice (including instructions and/or an instruction set) for managing the resources via the third-party service provider. Additionally, as used herein, an identity interface service may include one or more computing systems for providing a pluggable interface layer between the client applications and the service providers. For example, the identity interface may implement the advice service. However, in some examples, the advice service may be a stand-alone service that also provides a pluggable interface layer between the client applications and the service providers.

In some aspects, the advice service may provide the ability for mobile applications to receive instructions for acquisitions paths associated with authentication, authorization, auditing, token services, user profile management, password management, and/or ID management. Additionally, these services may be exposed or otherwise provided to the mobile applications or other external client applications that may not natively know how to interact with such services (e.g., services deployed by or within an enterprise solution). In one example, the advice service may provide a REST interface to the client applications to allow their communication of resource management requests to the advice service. In this way, the client applications may utilize their native Internet-based operations such as those utilizing, but not limited to, the hypertext transfer protocol (HTTP) and/or hypertext markup language (HTML). Further, the advice service may allow plug-in capabilities for the service providers including, but not limited to, enterprise solutions, identity services, access management services, and/or other identity-related solutions. For example, an identity service of an enterprise solution may plug in to the advice service to allow for secure acquisition path formation and transmission of such paths to the client application for service providers of which it would not ordinarily know how to access. RESTful APIs may be provided for such service providers and, in some examples, security models may be provided for securing the RESTful APIs.

In one non-limiting example, the advice service may receive one or more requests, from a client application, to manage a resource of a service provider, the resource management requests including, but not limited to, a request to change a user's profile information, access a web resource, etc. The request may be received from a client application, may be in REST format (i.e., as a REST call), and may indicate that the client application has been authenticated. The advice service may determine, based at least in part on the service provider (e.g., an access management service of an enterprise solution), the particular request, and/or the resource for which management is being requested, an appropriate acquisition pathway for obtaining appropriate authentication and/or access tokens. Alternatively, or in addition, the advice service may determine an appropriate instruction set (which may, in some examples, include a single instruction) for performing the resource management. The advice may be service provider specific and/or resource specific and it may change dynamically based at least in part on several factors including, but not limited to, the service provider configuration, the resource, the request, the context, and/or information previously obtained by the client application. The advice service may then transmit the advice to the client application. In some cases, the advice may include the acquisition pathway, the instruction set, and/or any other information that may aid the client application in performing the requested resource management. In some examples, the advice service may provide the response to the client application in REST format, in JavaScript Object Notation (JSON) format, or based at least in part on an API of the client application. The client application may then perform the instructions and, in some cases, provide appropriate authentication tokens to the advice service.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts a simplified example system or architecture 100 in which techniques for providing an advice service may be implemented. In architecture 100, one or more users 102 (i.e., account holders) may utilize user computing devices 104(1)-(N) (collectively, user devices 104) to access a web service application 106, or a user account accessible through the web service application 106, via one or more networks 108. In some aspects, the web service application 106 and/or user account may be hosted, managed, and/or provided by a computing resources service or service provider, such as by utilizing one or more service provider computers 110. The one or more service provider computers 110 may, in some examples, provide computing resources and/or services such as, but not limited, web services, data storage, email, identity management, authorization and/or authentication services, or the like. The one or more service provider computers 110 may also be operable to provide web hosting, application development platforms, implementation platforms, or the like to the one or more users 102.

The one or more service provider computers 110 may also deploy or otherwise utilize one or more proprietary or third-party identity services, access management services, or other services. In some examples, an advice service 112 implemented by one or more advice service computers 112 may act as a gateway or interface layer for interacting with the service provider computers 110 and/or its third-party service providers. In this way, new service providers may plug in and/or be added for access and/or resource management, and advice for client application and/or user devices 104 may be updated dynamically without making changes to the client applications and/or user devices 104. As such, in some cases, the user devices 104, the service provider computers 110 and/or the advice service computers 112 may each be accessible by one another via the one or more networks 108. Additionally, in some examples, the advice service of the advice service computers 112 and the services provided by the service provider computers 110 may be hosted on a single REST service infrastructure. In other words, the advice service computers 112 and the service provider computers 110 may be part of the same system (e.g., hosted within the same computing system).

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the web service application 106 over the networks 108, the described techniques may equally apply in instances where the users 102 interact with a service provider computer 110 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The web service application 106 may allow the users 102 to interact with the service provider computers 110, such as to store, access, and/or manage data, develop and/or deploy computer applications, and/or host web content. The one or more service provider computers 110, perhaps arranged in a cluster of servers or as a server farm, may host the web service application 106. Other server architectures may also be used to host the web service application 106. The web service application 106 may be capable of handling requests from many users 102 and serving, in response, various user interfaces that can be rendered at the user devices 104. The web service application 106 can be any type of website that supports user interaction, including social networking sites, online retailers, informational sites, blog sites, search engine sites, news and entertainment sites, and so forth. Additionally, the described techniques can be similarly implemented outside of the web service application 106.

As noted above, the architecture 100 may include one or more user devices. The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 110 via the networks 108, or via other network connections. Further, the user devices 104 may also be configured to implement one or more mobile application, RIAs, or SaaS applications. In some examples, however, these client applications may not be programmed with, or otherwise aware of, instructions for interacting with the service provider computers 112 to manage resources (e.g., secure resources of the service provider computers 112 that may, in some cases, be associated with a user of the client application). However, in some cases, the client applications may be able to communicate or otherwise interact with the advice service 112. In this way, the advice service computers 112 may act as an interface layer between the client application of the user devices 104 (e.g., mobile devices) and the service provider computers 110. Additionally, the advice service 112 may provide the appropriate instructions and/or code to the client application for communicating with or otherwise instructing the service providers to manage the secure resources.

In one illustrative configuration, the user devices 104 may include at least one memory 114 and one or more processing units (or processor(s)) 116. The processor(s) 116 may be implemented as appropriate in hardware, computer-executable instructions, firmware, or combinations thereof. Computer-executable instructions or firmware implementations of the processor(s) 116 may include computer-executable or machine-executable instructions written in any suitable programming language to perform the various functions described.

The memory 114 may store program instructions that are loadable and executable on the processor(s) 116, as well as data generated during the execution of these programs. Depending on the configuration and type of user device 104, the memory 114 may be volatile (such as random access memory (RAM)) and/or non-volatile (such as read-only memory (ROM), flash memory, etc.). The user device 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 114 may include multiple different types of memory, such as static random access memory (SRAM), dynamic random access memory (DRAM), or ROM.

Turning to the contents of the memory 114 in more detail, the memory 114 may include an operating system and one or more application programs or services for implementing the features disclosed herein including at least an advice console 118, such as a Web browser or dedicated application (e.g., a smart phone application, a tablet application, etc.) and/or the web service application 106. The advice console 118 may be configured to receive, store, and/or display a website or other interface for interacting with the advice service computers 112. Additionally, the memory 114 may store access credentials and/or other user information such as, but not limited to, user IDs, passwords, other user information, and/or resource management requests 120 to be sent to the service provider computers 110 and/or advice service computers 112. In some examples, the other client information may include information for authenticating an account access request such as, but not limited to, a device ID, a cookie, an IP address, a location, or the like. In addition, the other client information may include a user 102 provided response to a security question or a geographic location obtained by the user device 104. Further, the service requests 120 may include requests to update and/or manage identities, requests to access one or more service providers, requests to authenticate or authorize the user 102, etc.

Additionally, in some aspects, the advice console 118 may allow a user 102 to interact directly with the advice service computers 112. For example, the user devices 104 may make access, service, and/or identity management requests to the advice service computers 112 via the advice console 118. In some examples, the requests sent to the advice service computers 112 may be formatted as REST calls that were predefined and/or exposed by the advice service computers 112. Also utilizing the advice console 118, in some examples, a user may make requests for accessing the service provider computers. In some cases, these requests may be received by the advice service computers 112, as REST calls, and translated or otherwise utilized to generate one or more advices, acquisition paths, and/or instructions for the user devices 104 and/or respective client applications. As used herein, an acquisition path or pathway may be one or more operations that should be performed in order to complete the request. One or more different pathways may exist depending on the context, the service provider, the request and/or type of request, and/or configuration of the client application. In some cases, the pathways may change dynamically based at least in part on the changes made by the service providers.

In some aspects, the advice service computers 112 may also be any type of computing devices such as, but not limited to, mobile, desktop, thin-client, and/or cloud computing devices, such as servers. In some examples, the advice service computers 112 may be in communication with the user devices 104 via the networks 108, or via other network connections. The advice service computers 112 may include one or more servers, perhaps arranged in a cluster, as a server farm, or as individual servers not associated with one another. These servers may be configured to host features described herein including, but not limited to, the advice service. Additionally, in some aspects, the advice service computers 112 may be configured as part of an integrated, distributed computing environment.

In one illustrative configuration, the advice service computers 112 may include at least one memory 122 and one or more processing units (or processor(s)) 124. The processor(s) 124 may be implemented as appropriate in hardware, computer-executable instructions, firmware, or combinations thereof. Computer-executable instruction or firmware implementations of the processor(s) 124 may include computer-executable or machine-executable instructions written in any suitable programming language to perform the various functions described.

The memory 122 may store program instructions that are loadable and executable on the processor(s) 124, as well as data generated during the execution of these programs. Depending on the configuration and type of advice service computers 112, the memory 122 may be volatile (such as random access memory (RAM)) and/or non-volatile (such as read-only memory (ROM), flash memory, etc.). The advice service computers 112 or servers may also include additional storage 126, which may include removable storage and/or non-removable storage. The additional storage 126 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 122 may include multiple different types of memory, such as static random access memory (SRAM), dynamic random access memory (DRAM), or ROM.

The memory 122, the additional storage 126, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 122 and the additional storage 126 are all examples of computer storage media.

The advice service computers 112 may also contain communications connection(s) 128 that allow the service provider computers 110 to communicate with a stored database, another computing device or server, user terminals, and/or other devices on the networks 108. The advice service computers 112 may also include input/output (I/O) device(s) 130, such as a keyboard, a mouse, a pen, a voice input device, a touch input device, a display, speakers, a printer, etc.

Turning to the contents of the memory 122 in more detail, the memory 122 may include an operating system 132 and one or more application programs or services for implementing the features disclosed herein including a user application module 134 and/or an advice module 136. The user application module 134 may be configured to generate, host, or otherwise provide the advice console 118, and/or a website for accessing the advice console 118.

In some examples, the advice module 136 may be configured to provide a REST API, receive REST API calls, determine appropriate advice, acquisition paths, and/or instruction sets for performing service provider resource management requests, and/or provide the advice, paths, and/or instruction sets to the client applications. In other words, the advice module 136 may be utilized for interacting with the client applications and/or user devices 104, while determining advice, acquisition paths, and/or instruction sets based at least in part on APIs and/or interactions with the service providers 110.

By way of example only, and without limitation, a client application of a user device 104 may transmit a REST API call for performing a particular resource management operation. The advice module 136 may receive the API call and determine (in some cases, based at least in part on a particular service provider 110 corresponding to the request) an appropriate advice, acquisition path, or instruction set performing the request with respect to the service provider computers 110 at which the resource is stored. In some examples, the advice module 136 may be configured to transmit the advice, acquisition path, and/or instruction set to the client application of the user devices 104. Further, the advice module 136 may also be configured to allow plug-gability of the advice service computers 112, such that any number or type of service providers 110 may plug in to the advice service computers 112 and rely on the advice service computers 112 to interpret the REST calls of client applications on their behalf. A few examples of the operations of the advice service computers 112 are described in greater detail below with reference to at least FIGS. 2-9.

Additional types of computer storage media (which may also be non-transitory) that may be present in the advice service computers 112 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the advice service computers 112. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 2:
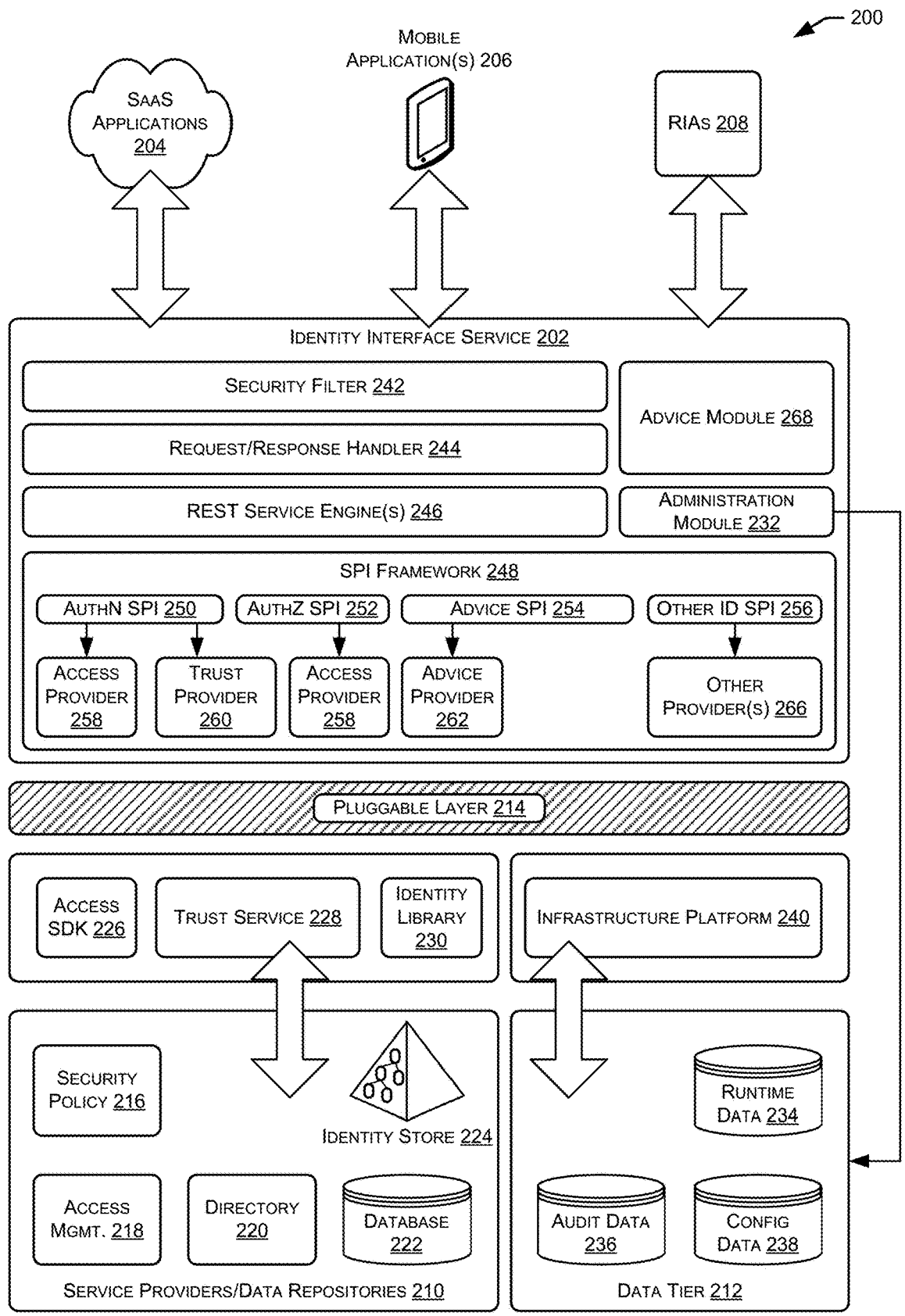
FIG. 2 is a simplified block diagram illustrating at least some features of the resource management advice described herein, according to at least one example.

As noted, in at least one example, one or more aspects of the environment or architecture 100 may incorporate and/or be incorporated into a distributed program execution service such as that hosted by the advice service computers 112. FIG. 2 depicts a simplified architecture 200 illustrating additional aspects and/or features of the advice service computers 112 of FIG. 1. Further, in some examples, an identity interface service may actually implement an advice service as one of its many services. For examples, FIG. 2 illustrates an identity interface service 202, such as that implemented by the advice service computers 112 of FIG. 1 (or alternatively, implementing the advice module 136 of FIG. 1), receiving information, requests, and/or instructions from one or more client applications such as, but not limited to SaaS applications 204, mobile applications 206, and/or RIAs 208. As noted above, these requests may be formatted, by the client applications 204, 206, 208, as REST calls and may be based at least in part on a REST API provided by the identity interface service 202. Additionally, the identity interface service 202 may be in communication with one or more service providers/data repositories 210 and/or a data tier 212 via a pluggable layer 214. As noted above, by providing a pluggable layer 214, the one or more service providers/data repositories 210 may be added and/or removed to the service 202 on the fly and/or independent of the type of client application with which it may interact. In this way, the service 202 may maintain flexibility.

In some examples, the service providers/data repositories 210 may include one or more security policy services 216, access management services 218, directory services 220, databases 222, and/or identity stores 224 (e.g., LDAP servers). Additionally, according to some aspects, the service providers/data repositories 210 may be in communication with one or more pluggable services such as, but not limited to, an access software development kit (SDK) 226, a trust service 228, and/or an identity library 230. In some examples, the access SDK 226, the trust service 228, and/or the identity library 230 may collectively make up the interface layer for plugging the service providers/data repositories 210 into the identity interface service 202 via the pluggable layer 214. For example, the access SDK 226 may be responsible for plugging the access management service 218 into the service 202.

The identity interface service 202 may also include an administration module 232 for controlling, managing, or otherwise communicating with one or more runtime data stores 234, audit data stores 236, and/or configuration data stores 238 of the data tier 212. The data tier 212 may be in communication with the service 202 via an infrastructure platform 240 which may be configured to attach the data tier 212 as well as perform internal file management, logging, monitoring, and/or other administrative tasks. In some cases, the administration module 232 and the data tier 212 may be responsible for controlling, configuring, managing, and/or otherwise administering the services and/or data associated with the identity interface service 202. Additionally, the identity interface service 202 may also include a security filter 242, a request/response handler 244, one or more REST service engines 246, and/or a service provider interface (SPI) framework 248.

In some aspects, the security filter 242 may be configured to maintain the security of the REST API that is provided by the identity interface service 202. In this way, only authorized and/or authenticated client applications may be provided with the REST APIs and/or only API calls from authorized and/or authenticated client applications may be processed. The request/response handler 244 may be configured to receive requests from, and provide responses to, the client applications 204, 206, 208, etc. In some examples, the REST service engines 246 may be configured to govern policies of the identity interface service 202 such as, but not limited to, enforcing compliance with rules, enhancing infrastructure security, and/or streamlining service operations of the identity interface service 202.

Further, the SPI framework 248 may translate, map, or otherwise determine appropriate method calls and/or instructions for the service providers/data repositories 210. These method calls and/or instructions may be based at least in part on the REST API call received and/or the service provider with which the request is associated. For example, and without limitation, the request/response handler 244 may receive a request to update an identity relationship. The response may be formatted as a REST call from one of the client applications 204, 206, 208. The request/response handler 244 may forward the request to the SPI framework 248 where one or more different instructions or sets of instructions may be determined. For example, the instructions may be different depending on the service provider/data repository 210 for which the request was intended. That is, if the request was for a database 220, the SPI framework 248 may determine a different instruction (or set of instructions) for updating the identity relationship than if the request was for an LDAP identity store 224.

In some aspects, implementation of the SPI framework 248 may include utilizing one or more SPIs such as, but not limited to, an authentication SPI 250, an authorization SPI 252, an advice SPI 254, and/or other ID SPIs 256. Additionally, the authentication SPI 250 may be configured to provide interaction with one or more access management providers 258 and/or one or more trust service providers 260. The authorization SPI 252 may be configured to provide interaction with the one or more access management providers 258. The advice SPI 254 may be configured to provide interaction with one more advice providers 262 such as, but not limited to, the advice service computers 112 of FIG. 1. Further, the other ID SPI 256 may include a profile SPI for interacting with one or more identity service providers and/or directory service providers, and/or may be configured to provide interaction with one or more other service providers 266 such as, but not limited to, profile services, password management services, policy management services, token exchange services, and/or user provisioning services. In this way, one or more individual SPIs may be responsible for communicating with the service providers/data repositories 210 via the pluggable layer 214. That is, the SPI framework 248 may act as a proxy between the client applications 204, 206, 208 and the one or more service providers 210.

Additionally, as noted above, the identity interface service 202 may be configured with an advice module 268 (e.g., to implement a service such as that described with reference to the advice module 136 of FIG. 1). The advice module 268 may be configured, in some cases, to receive RESTful resource management requests from the SaaS applications 204, mobile applications 206, and/or RIAs 208 and determine, based, at least in part, on a configuration of the client application (i.e., applications 204, 206, 208) and/or a configuration of the service provider that stores the resource, advice, acquisition paths, and/or instruction sets for managing the resource. For example, and without limitation, the advice module 268 of the identity interface service 202 may receive a request to update personal information of a logged-in user (e.g., the user's home address). Based at least in part on this request and/or the service provider that stores the home address information, the advice module 268 may determine a series of steps that the client application should perform in order to change the home address information. For example, and without limitation, the advice presented to the client application may include the following steps to be performed (not necessarily in this order): authenticate the client application; authenticate the user using a user ID and a password; acquire an access token by presenting a client token and a user token to a token service; and use the acquired access token to access a create, read, update, and delete (CRUD) service to update the user's home address by setting an "Authorization" HTTP header.

Figure 3:
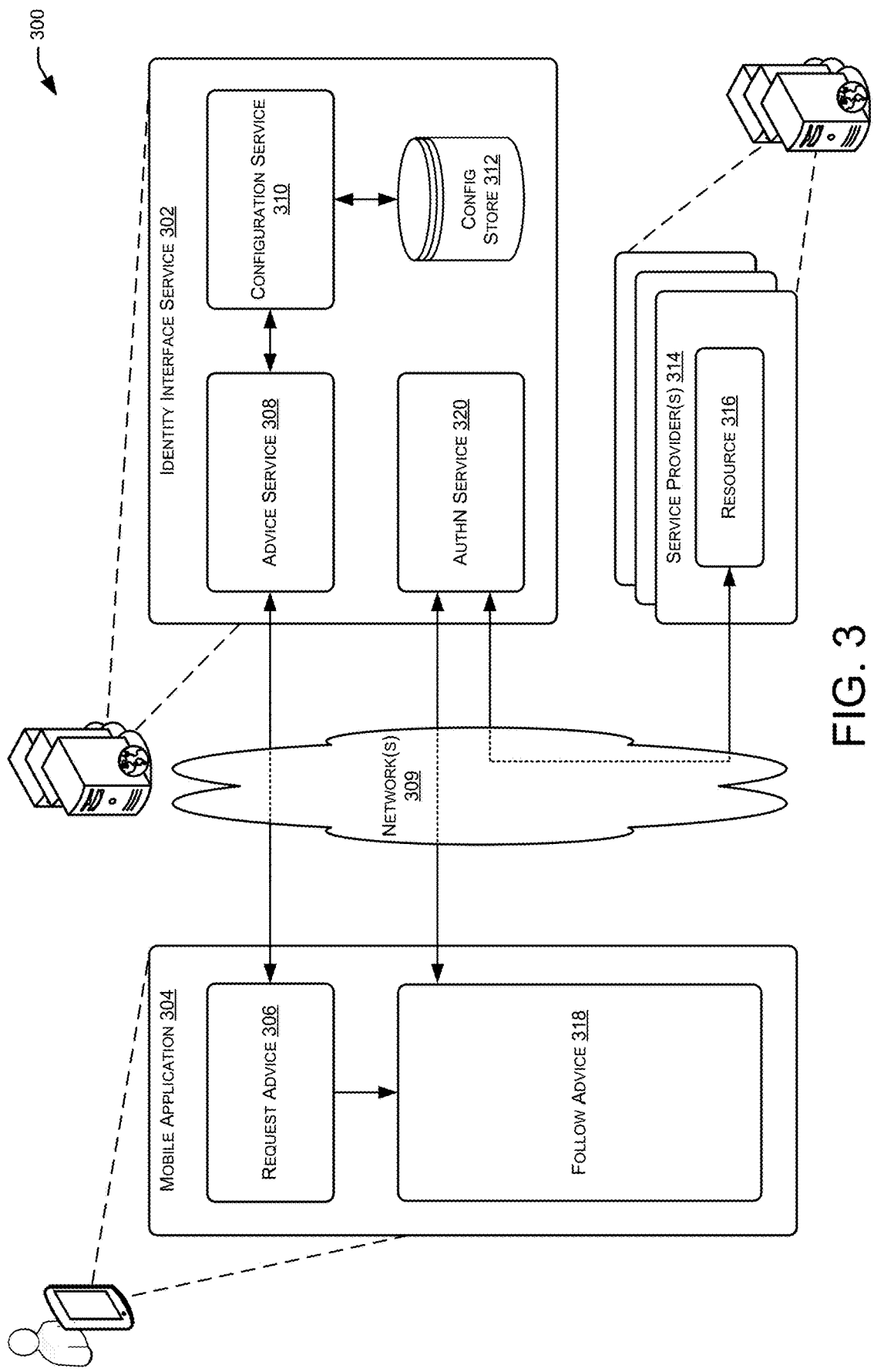
FIG. 3 is a simplified block diagram for illustrating a process flow of at least some features of the resource management advice described herein, according to at least one example.

FIG. 3 depicts a simplified example block diagram 300 illustrating one non-limiting process flow of the simplified example architecture 100 of FIG. 1 in which techniques for providing an advice service may be implemented. In the simplified block diagram 300, aspects of the disclosure are shown again with reference to an identity interface service 302 such as, but not limited to, that described above with reference to the identity interface service 202 of FIG. 2 and/or the advice service computers 112 of FIG. 1. However, in some examples, an identity interface service 302 may not be utilized, and aspects of the disclosure may be understood in the context of an advice service. In some aspects a client and/or mobile application 304 such as, but not limited to, a SaaS application may request advice 306. That is, the mobile application 304 may send a REST resource management request to an advice service 308 via one or more networks 309. In some examples, the advice service 308 may consult a configuration service 310 which may be operationally attached to a configuration data store 312. The configuration data store 312 may include configuration information associated with one or more service providers 314. The service providers 314 may store, control, or otherwise manage one or more resources 316 for which management has been requested.

As noted above, the configuration store 312 may include configuration information, token information, and/or other information associated with the one or more service providers 314. As such, the configuration service 310 may be configured to provide appropriate service provider configuration information to the advice service 308. Based at least in part on this configuration information, the advice service 308 may be able to determine advice for performing the requested resource management operation. The advice service 308 may then be configured to provide the advice (e.g., an instruction set and/or acquisition path for performing the resource management operation) back to the mobile application 304. In some cases, the mobile application 304 may follow the advice 318 by executing or otherwise performing one or more instructions. In at least one non-limiting example, the advice may include an instruction to authenticate the mobile application (i.e., the mobile device). As such, following the advice 318 may include requesting authentication, via the networks 309, from an authentication (AuthN) service 320 of the identity interface service 302. However, in some examples, the AuthN service 320 may not be part of the identity interface service 302, may be part of the service provider 314, or may be operated by a completely separate entity such as a third-party.

In some examples, the AuthN service 320 may perform authentication on the user and/or client tokens provided by the mobile application 304 and, upon being authenticated, the AuthN service 320 may provide appropriate access tokens to the mobile application 304. The mobile application 304 may then provide the access token to the identity interface service 302 for accessing the appropriate service provider 314. The mobile application 304 may also provide other information to the identity interface service 302 for interaction with the service provider 314 and/or perform one or more method calls based at least in part on the advice provided by the advice service 308. Another example of advice that may be provided from the advice service 308 may include, without limitation: instructions to authenticate a user using a user ID and password; acquire a token for payroll services by presenting a user token to an access management token service associated with the service provider 314; set a particular cookie; and invoke a uniform resource locator (URL) in a web view (e.g., to access a payroll web resource of a user of the mobile application 304). Further, at least one other non-limiting example of advice that may be provided by the advice service may include: instructions to authenticate the mobile application 304; authenticate a user of the mobile application 304 using a user ID and password; acquire a token for accessing a social platform resource by invoking a web URL to initiate an authorization flow; set the acquired token as an access token query parameter; and invoke a REST call to a URL associated with the social platform (e.g., to obtain a list of the user's "friends").

Figure 4:
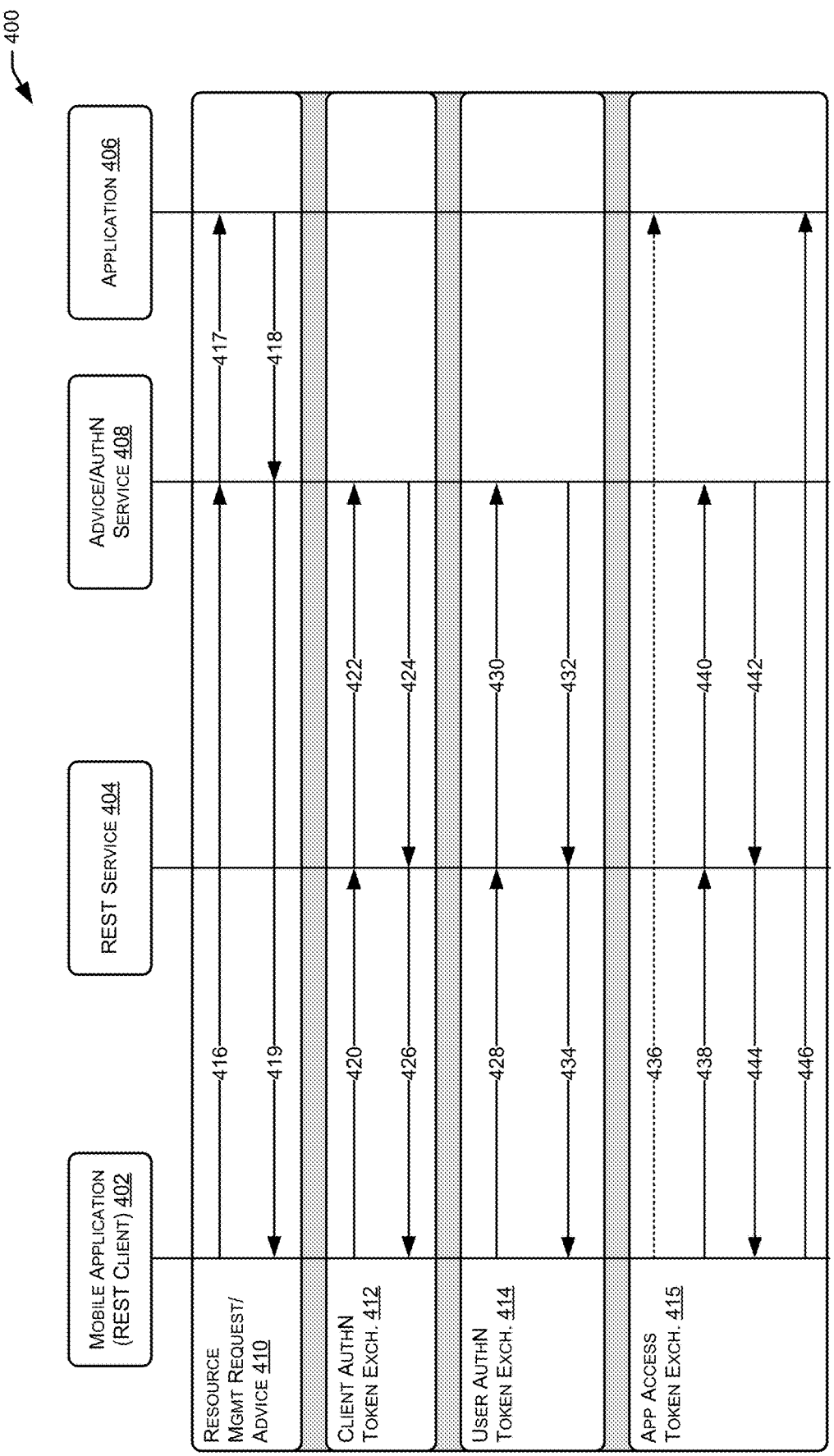
FIG. 4 is a simplified process flow diagram illustrating at least some features of the resource management advice described herein, according to at least one example.

FIG. 4 depicts a simplified process flow 400 of an example advice interaction performed in conjunction with an advice service as described above. In some examples, the simplified process flow 400 may be performed by one or more computing devices such as, but not limited to, the advice service computers 112 of FIG. 1. In at least one example, a mobile application 402 (e.g., a REST client or web client of a mobile device) may be in communication with a REST service 404 (e.g., the identity interface service 202 of FIG. 2) and one or more computer applications and/or service providers (e.g., the application 406). Additionally, the REST service 404 may also be in communication with one or more service providers 408 (e.g., the advice service and/or an authentication service provider). In this example, at least four process stages may be identified including, but not limited to, a resource management and/or advice request 410, a client authentication token exchange 412, a user authentication token exchange 414, and an application access token exchange 415. Additionally, in some examples, a portal may be utilized to interface between the mobile application 402 and the REST service 404, such that the REST service 404 may be invoked without the need for bundling any vendor specific (i.e., service provider specific) client components. Further, in some examples, an SDK may be utilized to appropriately communicate between the REST service 404 and the advice service 408 (or any other service provider).

According to some aspects, the resource management request/advice 410 may include the mobile application 402 transmitting a request for advice and/or a request for resource management to the advice service 408 at 416. As noted above, the request may come from a REST client of the mobile 402 and, as such, may be formatted as a REST call. The REST client 402 may have received a REST API endpoint from the REST service 404 and/or the advice service 408 (or AuthN service 408) such that the mobile REST client 402 is aware of the appropriate REST calls to make. At 417, the advice service 408 may consult the application 406 and/or a configuration service associated with the application to determine advice, an acquisition path, and/or an instruction set. As noted above, the advice, acquisition path, and/or instruction set may be resource specific. At 418, the application 406 and/or configuration service may provide service provider-, application-406, and/or resource-specific information back to the advice service 408. Based at least in part on this information, the advice service 408 may determine advice, an acquisition path, and/or an instruction to provide, at 419, back to the mobile application 402. In some examples, the advice provided at 419 may indicate to the mobile application 402 that the instruction set includes instructions to authenticate the client at 412, authenticate the user at 414, and then acquire an access token at 415.

As such, client authentication token exchange 412 may include attempting to acquire a client token indicating that the REST client 402 has been authenticated. At 420, the user agent 402 may transmit client credentials including, but not limited to, a client ID and a client password to the REST service 404. As discussed above at least with reference to FIG. 103, the REST service 404 may determine appropriate method calls for communicating with the one or more service providers. In this case, the REST service 404 may be communicating with an AuthN service provider 408 as opposed to the advice service 408. As such, the REST service 404 may transmit the authentication request to the AuthN provider 408 at 422. In response, the AuthN provider 408 may provide an appropriate client token at 424 to the REST service 404. At 426, the REST service 404 may provide the client token to the mobile application 402. Now that the client application (i.e., the mobile application 402) has been authenticated, the mobile application 402 may attempt to authenticate the user of the client application.

According to some aspects, the user authentication token exchange 414 may include attempting to acquire a user token indicating that the user of the REST client 402 has been authenticated. At 428, the mobile application 402 may transmit the client token (previously received from the AuthN provider 408) and client credentials including, but not limited to, a client user ID and a client password. The REST service 404 may provide the user credentials and client token to the AuthN provider 408, according to the appropriately corresponding method calls, at 430. In response, the AuthN provider 408 may provide a client token to the REST service 404 at 432. At 434, the REST service 404 may provide the client token to the mobile application 402.

In some examples, the application access token exchange may include the mobile application 402 transmitting, at 436, a GetToken request to the application 406 indicated by the context. In this way, in some examples, the application 406 may indicate to the AuthN provider 408 the appropriate access token to be presented upon authentication. The mobile application 402 may then transmit an access request to the REST service 404 at 438. The access request may include the client token and the user token (both previously received from the AuthN provider 408) and the appropriate context (e.g., the application 406, the resource being requested, and/or a service provider). At 440, the REST service 404 may provide the access request with the client token, user token, and context to the AuthN provider 408. Upon authentication by the AuthN provider 408, the AuthN provider 408 may provide an access token to the REST service at 442. The REST service 404 may then provide the access token to the mobile application 402, at 444, and the mobile application 402 may then gain access to the application 406 by providing the received access token at 446. In this way, the REST service 404 may act as a translator, proxy, or other interface for communication between the user agent (via REST calls) and the AuthN provider 408 (e.g., an enterprise solution that may not natively support calls from mobile applications). The mobile application 402 may now follow the advice, acquisition path, and/or instruction set to manage, update, or otherwise access a resource of the application 406 and/or service provider.

Further, the example architectures, tools, and computing devices shown in FIGS. 1-4 are provided by way of example only. Numerous other operating environments, system architectures, and device configurations are possible. Accordingly, embodiments of the present disclosure should not be construed as being limited to any particular operating environment, system architecture, or device configuration.

Illustrative Processes

FIGS. 5-9 illustrate simplified example flow diagrams showing respective processes 500, 600, 700, 800, and 900 for providing advice services. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 5:
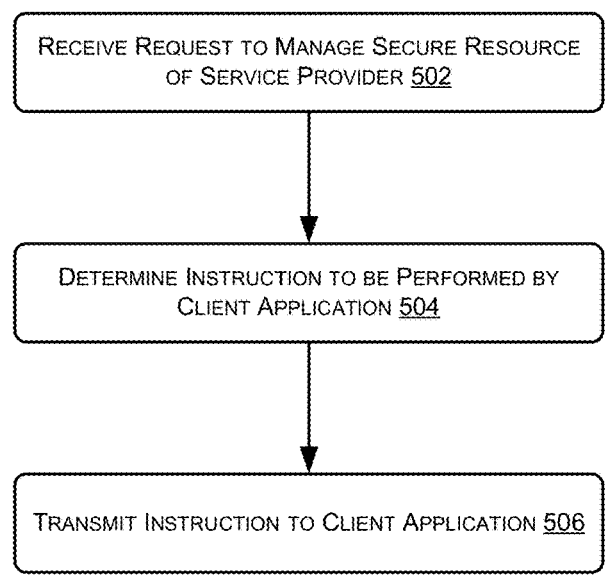
FIGS. 5-9 are simplified flow diagrams illustrating example processes for implementing at least some features of the resource management advice described herein, according to at least a few examples.

In some aspects, the process 500 of FIG. 5 may be performed by the one or more advice service computers 112 of FIG. 1. The process 500 may begin at 502 by receiving a request to manage a resource of a service provider. As noted above, the resource may be secured, such as by a password or other security method and may include, but is not limited to, personal profile information of a user, account information, configuration information, or the like. The request may be received from a client application (e.g., a mobile application, a SaaS, an RIA, etc.). At 504, the process 500 may determine an instruction to be performed by the client application. The instruction may include a set of instructions for performing the requested resource management and/or the instruction may include one or more steps or a path to follow in order for the client application to achieve the requested resource management. The process 500 may end at 506 by transmitting the determined instruction to the client application. Outside of the process 500, the client application may then follow the instruction to attempt to perform management of the resource.

Figure 6:
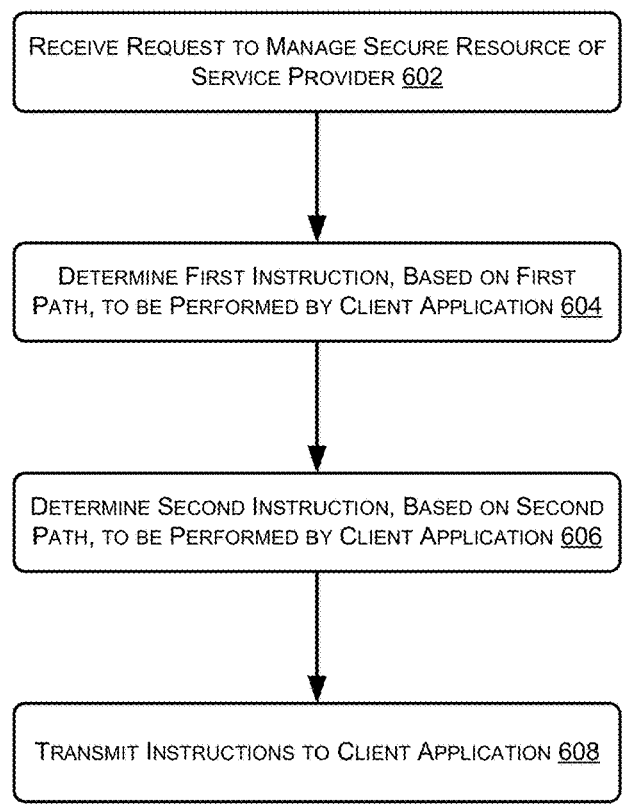

FIG. 6 illustrates a simplified example flow diagram showing the process 600 for providing features of an advice service. In some aspects, the process 600 of FIG. 6 may be performed by the one or more advice service computers 112 shown in FIG. 1. The process 600 may begin by receiving, from a client application, a request to manage a secure resource associated with a service provider at 602. As noted above, the service provider may include, but is not limited to, an identity service, an access management service, a token exchange service, an enterprise solution, combinations of the foregoing, or the like. Additionally, the management to be performed may be any function of the one or more service providers such as, but not limited to, an access request, an identity relationship management request, an authentication request, an authorization request, etc. At 604, the process 600 may determine a first instruction to be performed by the client application for performing the requested resource management. That is, a particular instruction or set of instructions may indicate a path or list of steps to be performed by the client application. The first instruction may be based at least in part on a first path. The process 600 may then determine, at 606, a second instruction to be performed by the client application. The second instruction may be based on a second path for performing the same resource management. At 608, the process 600 may end by transmitting the first and second instructions to the client application. In some aspects, the client application may then determine which of the two instructions to follow based at least in part on several factors including, but not limited to, the context of the instructions, the context of the client application, and/or other client application-specific and/or resource-specific information.

Figure 7:
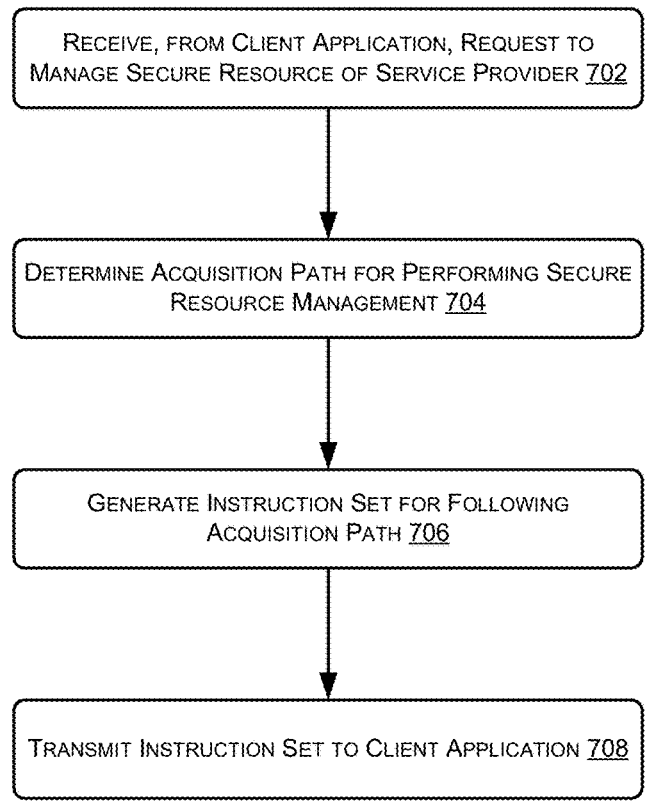

FIG. 7 illustrates a simplified example flow diagram showing the process 700 for providing features of an advice service. In some aspects, the process 700 of FIG. 7 may be performed by the one or more advice service computers 112 shown in FIG. 1. The process 700 may begin by receiving, from a client application, a request to manage a secure resource of a service provider at 702. The process 700 may also determine an acquisition path for performing the secure resource management at 704. The process 700 may generate an instruction set for following the acquisition path at 706. The process 700 may end at 708 by transmitting the generated instruction set to the client application.

Figure 8:
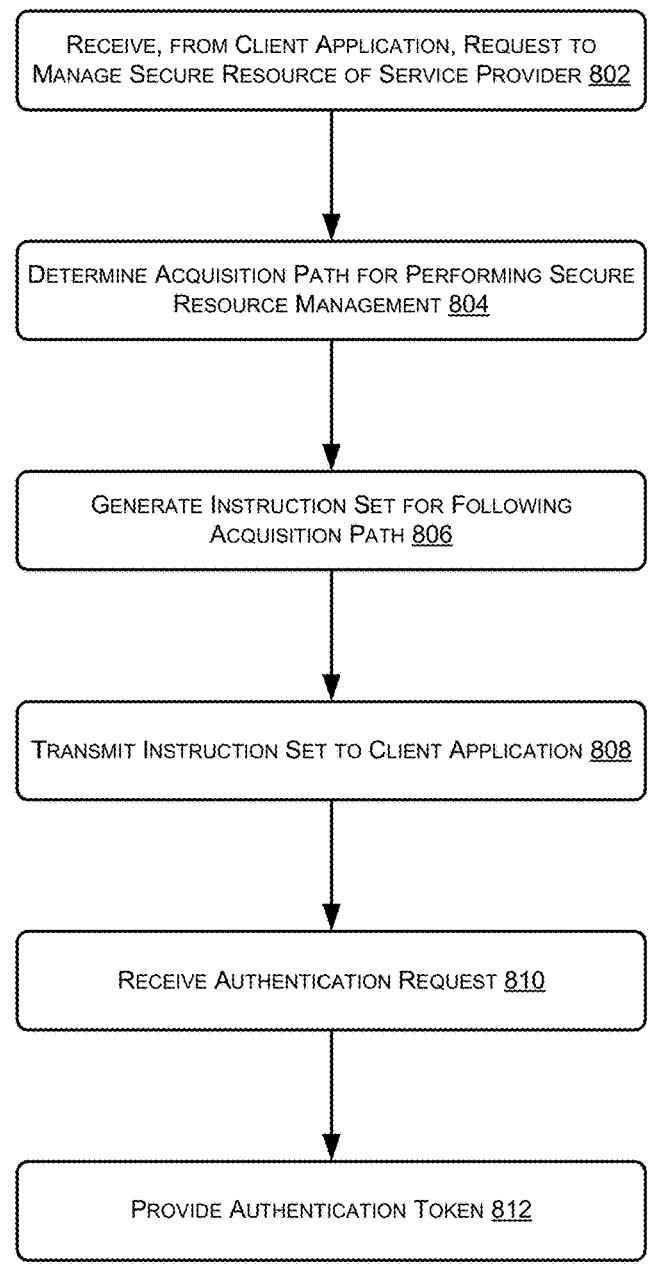

FIG. 8 illustrates a simplified example flow diagram showing the process 800 for providing features of an advice service. In some aspects, the process 800 of FIG. 8 may be performed by the one or more advice service computers 112 shown in FIG. 1. The process 800 may begin by receiving, from a client application, a REST interface request for managing a secure resource of a service provider at 802. The process 800 may also determine an acquisition path for performing the secure resource management at 804. As noted above, the appropriate acquisition path may be based at least in part on the resource for which management is being requested. At 806, the process 800 may generate an instruction set (which may include a single instruction) for following the acquisition path. The process 800 may then transmit, at 808, an instruction set to the client application. In some examples, the instruction set may instruct the client application to authenticate the client application and/or the user associated with the client application. Additionally, the process 800 may also be configured to provide authentication services as well as advice services. At 810, the process 800 may receive, based at least in part on the instruction set provided to the client application, an authentication request from the client application. The process 800 may end at 812 by providing an authentication token to the client application when access is granted. This access token, in some cases, may also be provided to the client application.

Figure 9:
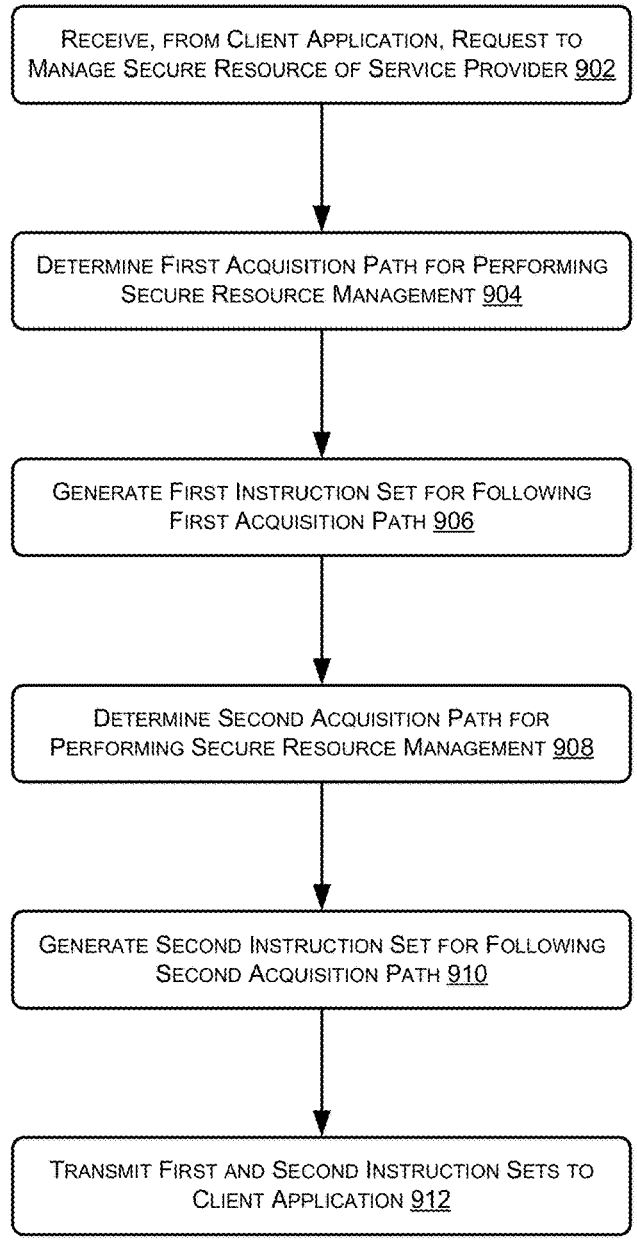

FIG. 9 illustrates a simplified example flow diagram showing the process 900 for providing features of an advice service. In some aspects, the process 900 of FIG. 9 may be performed by the one or more advice service computers 112 shown in FIG. 1. The process 900 may begin by receiving, from a client application, a request to manage a secure resource of a service provider at 902. At 904, the process 900 may determine a first acquisition path for performing the secure resource management. In some examples, at 906, the process 900 may also generate a first instruction set for following the determined first acquisition path. At 908, the process 900 may determine a second acquisition path for performing the secure resource management. In some examples, the first and second acquisition paths may be different methods for performing the same resource management. At 910, the process 900 may generate a second instruction set for following the second acquisition path. The process 900 may end at 912, by transmitting the first and second instruction sets to the client application. Other (e.g., more than just two) acquisition paths and instruction sets may be determined and/or generated for the same resource management operation. The client application may then determine or otherwise choose which instruction set to follow.

Illustrative Systems

Figure 10:
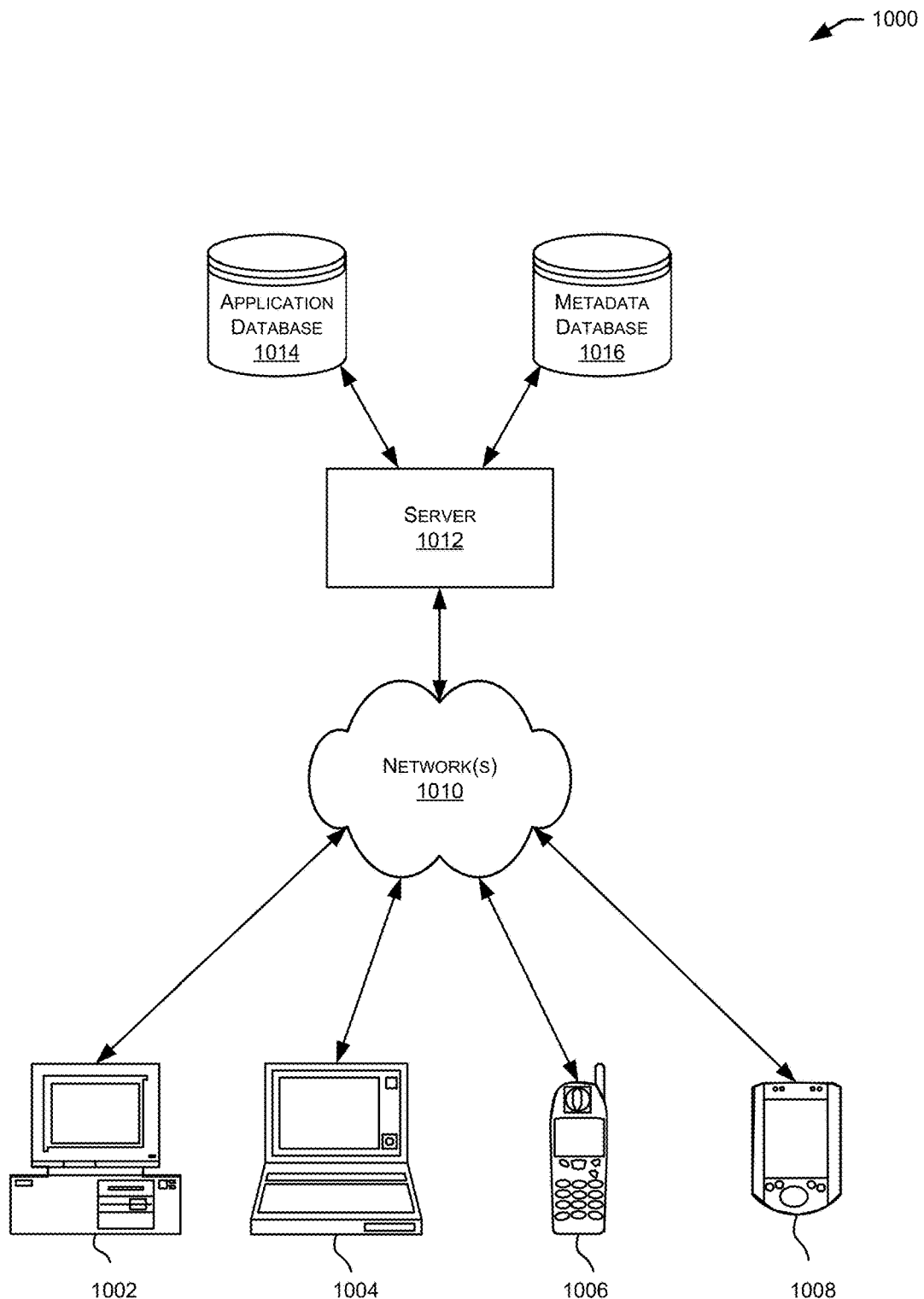
FIG. 10 is a simplified block diagram illustrating components of a system environment that may be used in accordance with an embodiment of the resource management advice described herein, according to at least one example.

FIG. 10 is a simplified block diagram illustrating components of a system environment 1000 that may be used in accordance with an embodiment of the present invention. As shown, system environment 1000 includes one or more client computing devices 1002, 1004, 1006, 1008, which are configured to operate a client application such as a web browser, proprietary client (e.g., Oracle Forms), or the like. In various embodiments, client computing devices 1002, 1004, 1006, and 1008 may interact with a server 1012.

Client computing devices 1002, 1004, 1006, 1008 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1002, 1004, 1006, and 1008 may be any other electronic device, such as a thin-client computer, Internet-enabled gaming system, and/or personal messaging device, capable of communicating over a network (e.g., network 1010 described below). Although exemplary system environment 1000 is shown with four client computing devices, any number of client computing devices may be supported. Other devices such as devices with sensors, etc. may interact with server 1012.

System environment 1000 may include a network 1010. Network 1010 may be any type of network familiar to those skilled in the art that can support data communications using any of a variety of commercially-available protocols, including without limitation TCP/IP, SNA, IPX, AppleTalk, and the like. Merely by way of example, network 1010 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1000 also includes one or more server computers 1012 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present invention.

Server 1012 may run an operating system including any of those discussed above, as well as any commercially available server operating system. Server 1012 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 1000 may also include one or more databases 1014, 1016. Databases 1014, 1016 may reside in a variety of locations. By way of example, one or more of databases 1014, 1016 may reside on a non-transitory storage medium local to (and/or resident in) server 1012. Alternatively, databases 1014, 1016 may be remote from server 1012, and in communication with server 1012 via a network-based or dedicated connection. In one set of embodiments, databases 1014, 1016 may reside in a storage-area network (SAN) familiar to those skilled in the art. Similarly, any necessary files for performing the functions attributed to server 1012 may be stored locally on server 1012 and/or remotely, as appropriate. In one set of embodiments, databases 1014, 1016 may include relational databases, such as databases provided by Oracle, that are adapted to store, update, and retrieve data in response to SQL-formatted commands.

Figure 11:
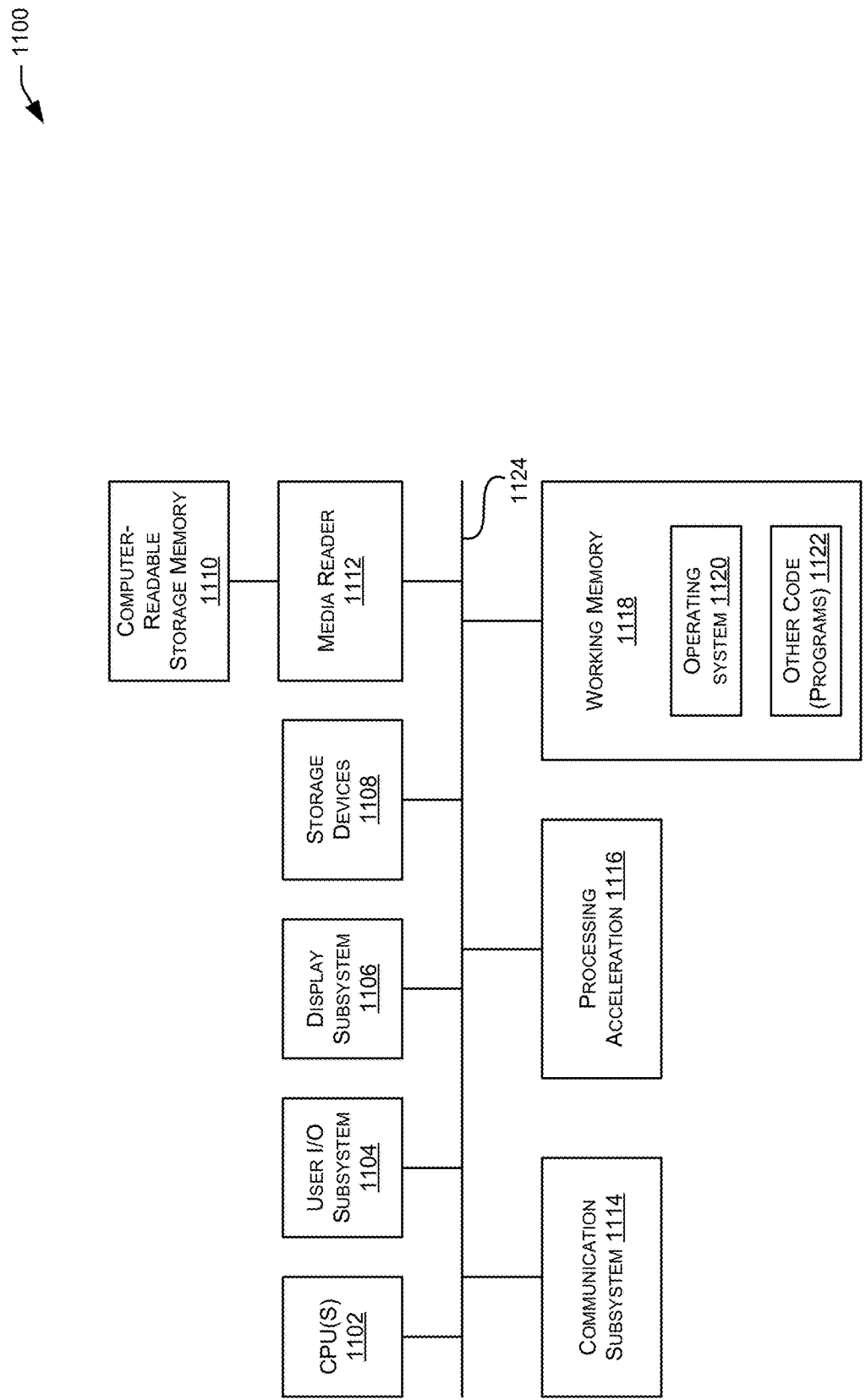
FIG. 11 is a simplified block diagram illustrating a computer system that may be used in accordance with embodiments of the resource management advice described herein, according to at least one example.

FIG. 11 is a simplified block diagram of a computer system 1100 that may be used in accordance with embodiments of the present invention. For example servers 112 and/or 302 may be implemented using a system such as system 1100. Computer system 1100 is shown comprising hardware elements that may be electrically coupled via a bus 1124. The hardware elements may include one or more central processing units (CPUs) 1102, one or more input devices 1104 (e.g., a mouse, a keyboard, etc.), and one or more output devices 1106 (e.g., a display device, a printer, etc.). Computer system 1100 may also include one or more storage devices 1108. By way of example, the storage device(s) 1108 may include devices such as disk drives, optical storage devices, and solid-state storage devices such as a random access memory (RAM) and/or a read-only memory (ROM), which can be programmable, flash-updateable and/or the like.

Computer system 1100 may additionally include a computer-readable storage media reader 1112, a communications subsystem 1114 (e.g., a modem, a network card (wireless or wired), an infra-red communication device, etc.), and working memory 1118, which may include RAM and ROM devices as described above. In some embodiments, computer system 1100 may also include a processing acceleration unit 1116, which can include a digital signal processor (DSP), a special-purpose processor, and/or the like.

Computer-readable storage media reader 1112 can further be connected to a computer-readable storage medium 1110, together (and, optionally, in combination with storage device(s) 1108) comprehensively representing remote, local, fixed, and/or removable storage devices plus storage media for temporarily and/or more permanently containing computer-readable information. Communications system 1114 may permit data to be exchanged with network 1212 and/or any other computer described above with respect to system environment 1100.

Computer system 1100 may also comprise software elements, shown as being currently located within working memory 1118, including an operating system 1120 and/or other code 1122, such as an application program (which may be a client application, Web browser, mid-tier application, RDBMS, etc.). In an exemplary embodiment, working memory 1118 may include executable code and associated data structures used for relying party and open authorization-related processing as described above. It should be appreciated that alternative embodiments of computer system 1100 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

Illustrative methods and systems for providing statistically triggered data placement are described above. Some or all of these systems and methods may, but need not, be implemented at least partially by architectures such as those shown in FIGS. 1-9 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A mobile device, comprising:
a memory device of storing a plurality of instructions; and
one or more computer processors configured to access the memory device and execute the plurality of instructions to at least:
execute, by at least one of the one or more computer processors of the mobile device, a security agent application for communicating with a remote authentication service provider computer;
execute, by the at least one of the one or more computer processors of the mobile device, a first local application that is different from the security application;
receive, by the security agent application of the mobile device that is implemented by the at least one of the one or more computer processors of the mobile device, a request to access a first remote service hosted external to the mobile device, the request provided to the security agent application by the first local application of the mobile device;
provide, by the security agent application of the mobile device, an authentication request to the remote authentication service provider computer;
receive, by the security agent application of the mobile device, a first access token for enabling the first local application to access the first remote service;
provide, by the security agent application of the mobile device, the first access token to the first local application; and
provide, by the security agent application of the mobile device, a second access token for enabling a second local application of the mobile device to access a second remote service hosted external to the mobile device, the second access token provided to the second local application of the mobile device.

2. The system of claim 1, wherein the security agent application is configured to provide single sign-on for at least one of the local application, the local browser application, or other applications of the mobile device.

3. The system of claim 2, wherein the second local application of the mobile device comprises a browser application of the mobile device associated with a web application service provider or a hybrid application of the mobile device configured as a native application with an embedded browser associated with a hybrid application service provider.

4. The system of claim 1, wherein the authentication request is provided to the remote authentication service provider as a representational state transfer (REST) method call.

5. The system of claim 1, wherein the one or more computer processors are further configured to execute the plurality of instructions to determine, based at least in part on a credential included in the authentication request, when a user is authenticated, and wherein the determination is based at least in part on receiving, from a third-party service, an indication that the user is authenticated.

6. A non-transitory computer-readable memory storing a plurality of instructions executable by one or more computer processors of a mobile device, the plurality of instructions, when executed, cause the one or more computer processors to at least:
execute, by at least one of the one or more computer processors of the mobile device, a security agent application for communicating with a remote authentication service provider computer;
execute, by the at least one of the one or more computer processors of the mobile device, a first local application that is different from the security application;
receive, by the security agent application of the mobile device that is implemented by the at least one of the one or more computer processors of the mobile device, a request to access a first remote service hosted external to the mobile device, the request provided to the security agent application by the first local application of the mobile device;
provide, by the security agent application of the mobile device, an authentication request to the remote authentication service provider computer;
receive, by the security agent application of the mobile device, a first access token for enabling the first local application to access the first remote service;
provide, by the security agent application of the mobile device, the first access token to the first local application; and
provide, by the security agent application of the mobile device, a second access token for enabling a second local application of the mobile device to access a second remote service hosted external to the mobile device, the second access token provided to the second local application of the mobile device.

7. The non-transitory computer-readable memory of claim 6, wherein the security agent application of the mobile device is configured to provide single sign-on for the second local application of the mobile device.

8. The non-transitory computer-readable memory of claim 7, wherein the second local application of the mobile device comprises a browser application of the mobile device associated with a web application service provider or a hybrid application of the mobile device configured as a native application with an embedded browser associated with a hybrid application service provider.

9. The non-transitory computer-readable memory of claim 6, wherein the first local application comprises a browser application of the mobile device associated with a web application service provider and the second local application comprises a native application of the mobile device associated with an application service provider.

10. The non-transitory computer-readable memory of claim 6, wherein the first local application comprises a native application of the mobile device associated with an application service provider.

11. The non-transitory computer-readable memory of claim 10, wherein the second local application comprises a browser application of the mobile device associated with a web application service provider.

12. The non-transitory computer-readable memory of claim 10, wherein the second local application comprises a second native application of the mobile device associated with a second application service provider.

13. The non-transitory computer-readable memory of claim 6, wherein the authentication request is provided to the remote authentication service provider as a representational state transfer (REST) method call.

14. The non-transitory computer-readable memory of claim 6, wherein the second token provided to the second local application enables the second local application to log in to an remote application service provider associated with the second local application on behalf of the user without the user providing log-in credentials to log in to the remote application service provider associated with the second local application.

15. A computer-implemented method configured to be executed by one or more computer processors of a mobile device, comprising:
   executing, by at least one of the one or more computer processors of the mobile device, a security agent application for communicating with a remote authentication service provider computer;
   execute, by the at least one of the one or more computer processors of the mobile device, a first local application that is different from the security application;
   receiving, by the security agent application of the mobile device that is implemented by the at least one of the one or more computer processors of the mobile device, a request to access a first remote service hosted external to the mobile device, the request provided to the security agent application by the first local application of the mobile device;
   providing, by the security agent application of the mobile device, an authentication request to the remote authentication service provider computer;
   receiving, by the security agent application of the mobile device, a first access token for enabling the first local application to access the first remote service;
   providing, by the security agent application of the mobile device, the first access token to the first local application; and
   providing, by the security agent application of the mobile device, a second access token for enabling a second local application of the mobile device to access a second remote service hosted external to the mobile device, the second access token provided to the second local application of the mobile device.

16. The computer-implemented method of 15, wherein the authentication request is provided to the remote authentication service provider as a representational state transfer (REST) method call.

17. The computer-implemented method of 15, wherein the authentication request is provided to request authentication of a user of the mobile device.

18. The computer-implemented method of claim 17, wherein the first access token is received from the remote authentication service provider based at least in part on authentication of the user.

19. The computer-implemented method of claim 15, further comprising receiving, by the security agent application of the mobile device, the second access token from the remote authentication service provider.

20. The computer-implemented method of claim 15, wherein the second access token is provided to the second local application by the security agent application of the mobile device at least in response to a request from the second local application to access the second remote service.

* * * * *

UNITED STATES PATENT AND TRADEMARK OFFICE
CERTIFICATE OF CORRECTION

PATENT NO. : 10,621,329 B2  
APPLICATION NO. : 16/392398  
DATED : April 14, 2020  
INVENTOR(S) : Sondhi et al.

Page 1 of 1

It is certified that error appears in the above-identified patent and that said Letters Patent is hereby corrected as shown below:

In the Specification

Column 3, Line 48, delete "(MA)." and insert -- (RIA). --, therefor.

In the Claims

Column 24, Line 18, Claim 16, after "of" insert -- claim --.

Column 24, Line 22, Claim 17, after "of" insert -- claim --.

Signed and Sealed this  
Sixth Day of April, 2021

Drew Hirshfeld  
*Performing the Functions and Duties of the  
Under Secretary of Commerce for Intellectual Property and  
Director of the United States Patent and Trademark Office*